United States Patent
Shi

(10) Patent No.: US 10,319,273 B2
(45) Date of Patent: Jun. 11, 2019

(54) ARRAY SUBSTRATES AND DISPLAY PANELS

(71) Applicant: Shenzhen China Star Optoelectronics Semiconductor Display Technology Co., Ltd., Shenzhen, Guangdong (CN)

(72) Inventor: Longqiang Shi, Guangdong (CN)

(73) Assignee: Shenzhen China Star Optoelectronics Semiconductor Display Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/577,843

(22) PCT Filed: Aug. 22, 2017

(86) PCT No.: PCT/CN2017/098447
§ 371 (c)(1),
(2) Date: Nov. 29, 2017

(87) PCT Pub. No.: WO2019/010760
PCT Pub. Date: Jan. 17, 2019

(65) Prior Publication Data
US 2019/0019443 A1    Jan. 17, 2019

(30) Foreign Application Priority Data

Jul. 12, 2017 (CN) .......................... 2017 1 0565226

(51) Int. Cl.
*G06F 3/048* (2013.01)
*G09G 3/20* (2006.01)
*G06F 3/14* (2006.01)

(52) U.S. Cl.
CPC .............. *G09G 3/20* (2013.01); *G06F 3/1446* (2013.01); *G09G 2300/026* (2013.01); *G09G 2300/0452* (2013.01)

(58) Field of Classification Search
CPC combination set(s) only.
See application file for complete search history.

(56) References Cited

U.S. PATENT DOCUMENTS

| | | | |
|---|---|---|---|
| 2012/0050240 A1 | 3/2012 | Yukio et al. | |
| 2013/0021231 A1 | 1/2013 | Yuki et al. | |
| 2014/0218956 A1 | 8/2014 | Wu | |
| 2014/0306985 A1* | 10/2014 | Jeong | G09G 3/3233 345/601 |
| 2018/0293956 A1* | 10/2018 | Yao | G09G 5/003 |

FOREIGN PATENT DOCUMENTS

| | | |
|---|---|---|
| CN | 101710479 B | 5/2010 |
| KR | 20040034239 A | 4/2004 |

* cited by examiner

Primary Examiner — Van N Chow
(74) Attorney, Agent, or Firm — Andrew C. Cheng

(57) ABSTRACT

Disclosed are an array substrate and a display panel. The array substrate comprises: a first display area and a second display area which are close to each other; wherein in the first display area, an area of at least one pixel unit in the row of the pixel units close to the second display area is smaller an area of a pixel unit of a non-edge row; and/or in the second display area, an area of at least one pixel unit in the row of the pixel units close to the first display area is smaller an area of a pixel unit of a non-edge row. With the aforesaid manner, the array substrate provided by the present invention can prevent the split screen during the split screen driving.

20 Claims, 4 Drawing Sheets

ARRAY SUBSTRATES AND DISPLAY PANELS

FIELD OF THE INVENTION

The present invention relates to a display field, and more particularly to an array substrate and a display panel.

BACKGROUND OF THE INVENTION

In recent years, the user's demand for the display effect of the display panel increases gradually. The ultra large size (such as 85 inches or 95 inches), ultra high definition display panels are favored by the users.

In the display panels of ultra large size, there is a problem that the data line is overloaded. The problem may deteriorate the display quality of the display panel. For now, for solving the foregoing problems, the split screen design is commonly utilized. For instance, the display panel is divided into two areas. Each area comprises one scanning driver and one data driver. The two areas simultaneously scan and control the pixels in the respective areas so that the load of the data lines is reduced to half the original.

The inventors of the present invention have found during the long-term research and development. The foregoing row scanning split screen driving design is equivalent to the splicing of the two screens. The electrical properties of the two screens might have slight difference. Such difference can be most significant at the junction of the screens. The split screen may be observed at the junction of the screens when it is severe.

SUMMARY OF THE INVENTION

An objective of the present invention is to provide an array substrate and a display panel, which can prevent the split screen during the split screen driving.

For solving the aforesaid technical issue, the technical solution employed by the present invention is: providing an array substrate, comprising: a first display area, comprising a plurality of pixel units arranged in array, wherein the pixel units in the first display area are coupled to a first scanning driver; a second display area, being adjacent to the first display area and comprising a plurality of pixel units arranged in array, wherein the pixel units in the second display area are coupled to a second scanning driver and the pixel units in the first display area and the pixel units in the second display area constitute a pixel array; wherein a row of pixel units in the first display area close to the second display area is as a first scanning start row, an area of at least one pixel unit in the row of the pixel units as the first scanning start row is smaller an area of a pixel unit of a non-edge row and the area of the at least one pixel unit in the row of the pixel units as the first scanning start row is 0.1 to 0.9 of the area of the pixel unit of the non-edge row in the first display area; and/or a row of pixel units in the second display area close to the first display area is as a second scanning start row, an area of at least one pixel unit in the row of the pixel units as the second scanning start row is smaller an area of a pixel unit of a non-edge row and the area of the at least one pixel unit in the row of the pixel units as the second scanning start row is 0.1 to 0.9 of the area of the pixel unit of the non-edge row in the second display area.

For solving the aforesaid technical issue, another technical solution employed by the present invention is: providing an array substrate, comprising: a first display area, comprising a plurality of pixel units arranged in array; a second display area, being adjacent to the first display area and comprising a plurality of pixel units arranged in array, wherein the pixel units in the first display area and the pixel units in the second display area constitute a pixel array; wherein in the first display area, an area of at least one pixel unit in the row of the pixel units close to the second display area is smaller an area of a pixel unit of a non-edge row; and/or in the second display area, an area of at least one pixel unit in the row of the pixel units close to the first display area is smaller an area of a pixel unit of a non-edge row.

For solving the aforesaid technical issue, another technical solution employed by the present invention is: providing a display panel, comprising the array substrate in any of the aforesaid embodiments.

The benefits of the present invention are: different from the condition of prior arts, the array substrate provided by the invention uses the split screen driving mode and comprises a first display area and a second display area, wherein in the first display area, an area of at least one pixel unit in the row of the pixel units close to the second display area is smaller an area of a pixel unit of the non-edge row; and/or in the second display area, an area of at least one pixel unit in the row of the pixel units close to the first display area is smaller an area of a pixel unit of the non-edge row; the array substrate provided by the present invention reduces the area of at least one pixel unit in two rows of pixel units at the split screen position and the smaller the area of the pixel unit is, the smaller the opening area becomes and the display brightness is reduced, which can solve the brightness issue of two screens due to the electrical property difference while the split screen driving to prevent the split screen during the split screen driving.

Besides, as one row of pixel units of the first display area close to the second display area is the row scanning start position and/or one row of pixel units of the second display area close to the first display area is the row scanning start position, it is possible to reduce the display brightness of the pixel unit at the scanning start position by reducing the area of the at least one pixel unit in the two rows of pixel units at the split screen position, thereby alleviating the issue that the first row of pixel units is too bright because the gate scanning waveform of the first row is too good according to the present invention.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are merely part of embodiments of the present invention, but not all embodiments. Based on the embodiments of the present invention, all other embodiments to those of ordinary skill in the premise of no creative efforts obtained, should be considered within the scope of protection of the present invention.

Figure 1:
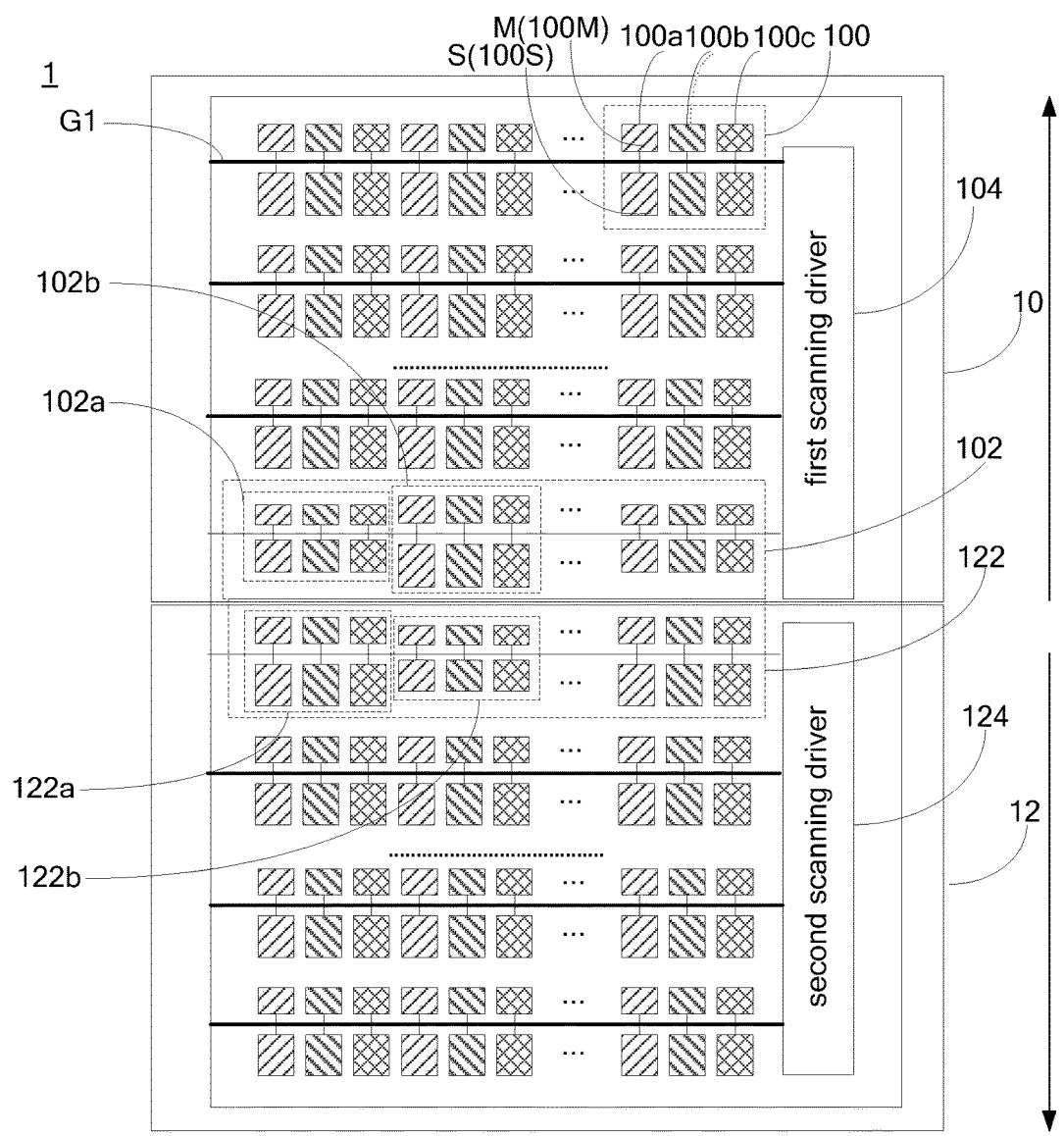
FIG. 1 is a structure diagram of one embodiment according to an array substrate of the present invention.

Please refer to FIG. 1. FIG. 1 is a structure diagram of one embodiment according to an array substrate of the present invention. The array substrate 1 comprises a first display area 10 and a second display area 12 which are close to each other. In one embodiment, as shown in FIG. 1, the array substrate provided by the invention can use the row scanning split screen driving mode. The first display area 10 and the second display area 12 simultaneously scan and control the rows of pixels in the respective areas. The duration of completely scanning the all gate lines in the array substrate 1 is reduced to half of the original and the load of the data lines is reduced to half the original. The row scanning mode of the first display area 10 and/or the second display area 12 may be simultaneously scanned from both sides of the array substrate 1 to the middle (i.e., the junction of the first display area 10 and the second display area 12), or may be simultaneously scanned from the middle of the substrate 1 to the both sides. Optionally, one display area is scanned from the middle of the array substrate 1 to the side of the array substrate 1 and the other display area is scanned from the side of the array substrate 1 to the middle of the array substrate 1. In another embodiment, the array substrate 1 provided by the invention can comprise three display areas. Each of the display areas can respectively scan and control the rows of pixels in the respective areas. All scan modes of the display areas can be the same or different. In one another embodiment, the array substrate provided by the invention can also use the column scanning split screen driving mode. At least two data drivers are respectively used to control the columns of pixels in the respective areas.

Specifically, referring to FIG. 1, the first display area 10 comprises a plurality of pixel units arranged in array; the second display area 12, which is adjacent to the first display area 10, also comprises a plurality of pixel units arranged in array. The pixel units in the first display area 10 and the pixel units in the second display area 12 constitute a pixel array; in one application scenario, each pixel unit in the first display area 10 and in the second display area 12 comprises a red (R) sub pixel unit, a green (G) sub pixel unit and a blue (B) sub pixel unit. One pixel unit 100 in the first display area 10 is illustrated. The pixel unit 100 comprises an R sub pixel unit 100a, a G sub pixel unit 100b and a B sub pixel unit 100c; in one embodiment, as shown in FIG. 1, the R sub pixel unit 100a of the pixel unit 100 is illustrated. The R sub pixel unit 100a comprises a main pixel M and a sub pixel S. The main pixel M comprises a main pixel electrode 100M and a main pixel thin film transistor. The sub pixel S comprises a sub pixel electrode 100S and a sub pixel thin film transistor. Both the gate of the main pixel thin film transistor and the gate of the sub pixel thin film transistor are coupled to the gate line G1 of the corresponding row of pixels. In other embodiments, the structure of every sub pixel unit can also alternative and the present invention is not limited thereto.

In the first display area 10, an area of at least one pixel unit in the row of the pixel units 102 close to the second display area 12 is smaller an area of a pixel unit of a non-edge row in the first display area 10. As shown in FIG. 1, the non-edge row in the first display area 10 refers to the rest rows of pixel units except the row of the pixel units 102 and the row of the pixel units corresponding to the gate line G1 in the first display area 10; and/or in the second display area 12, an area of at least one pixel unit in the row of the pixel units 122 close to the first display area 10 is smaller an area of a pixel unit of a non-edge row in the second display area 12. In one embodiment, in the first display area 10, the area of the at least one pixel unit in the row of the pixel units 102 close to the second display area 12 is 0.1 to 0.9 (such as 0.1, 0.5, 0.7 and 0.9) of the area of the pixel unit of the non-edge row in the first display area 10; and/or in the second display area 12, the area of the at least one pixel unit in the row of the pixel units 122 close to the first display area 10 is 0.1 to 0.9 (such as 0.1, 0.5, 0.7 and 0.9) of the area of the pixel unit of the non-edge row in the second display area 12. In one application scenario, the row amounts of the pixel units of the first display area 10 and the second display area 12 are the same. In sum, the array substrate provided by the present invention reduces the area of at least one pixel unit in two rows of pixel units at the split screen position and the smaller the area of the pixel unit is, the smaller the opening area becomes and the display brightness is reduced, which can solve the brightness issue of two screens due to the electrical property difference while the split screen driving to reduce the probability of the split screen during the split screen driving.

In one application scenario, as shown in FIG. 1, in the first display area 10, the row of pixel units 102 close to the second display area 12 comprises a plurality of pixel units 102a of first type and a plurality of pixel units 102b of second type, wherein the plurality of pixel units 102a of first type and the plurality of pixel units 102b of second type are alternated respectively according to predetermined amounts, an area of the pixel units 102a of first type is smaller than the area of the pixel unit of the non-edge row in the first display area 10 and an area of the pixel units 102b of second type is the same as the area of the pixel unit of the non-edge row in the first display area 10; in one embodiment, the area of the pixel units 102a of first type is 0.1 to 0.9 (such as 0.1, 0.5, 0.7 and 0.9) of the area of the pixel units 102b of second type; in another embodiment, the pixel units 102a of first type are marked as A and the pixel units 102b of second type are marked as B. The arrangement of the pixel units in the row of the pixel units 102 can be a manner of ABAB . . . , a manner of AABAAB . . . or a manner of AAABBAAABB . . . . In other embodiments, the other arrangements can also be illustrated and the present invention is not limited thereto.

In another application scenario, as shown in FIG. 1, the row of pixel units 122 in the second display area 12 close to the first display area 10 comprises a plurality of pixel units 122a of third type and a plurality of pixel units 122b of fourth type, wherein the plurality of pixel units 122a of third type and the plurality of pixel units 122b of fourth type are alternated respectively according to predetermined amounts, an area of the pixel units 122a of third type is the same as the area of the pixel unit of the non-edge row in the second display area 12 and an area of the pixel units 122b of fourth type is smaller than the area of the pixel unit of the non-edge row in the second display area 12. In one embodiment, the area of the pixel units 122b of fourth type is 0.1 to 0.9 (such as 0.1, 0.5, 0.7 and 0.9) of the area of the pixel units 122a of third type; in another embodiment, the pixel units 122a of third type are marked as C and the pixel units 122b of fourth type are marked as D. The arrangement of the pixel units in the row of the pixel units 122 can be a manner of CDCD . . . , a manner of CCDCCD . . . or a manner of CCCDDCCCDD . . . . In other embodiments, the other arrangements can also be illustrated and the present invention is not limited thereto.

In another application scenario, the area of the pixel units 122b of fourth type is the same as the area of the pixel units 102a of first type; in another application scenario, the area of the pixel units 102b of second type is the same as the area of the pixel units 122a of third type. In one embodiment, the area of the pixel units 102b of second type and the pixel units 122a of third type can be the same as the area of the non-edge rows of pixel units; in another application scenario, the pixel units 102a of first type in the first display area 10 respectively correspond to the pixel units 122a of third type in the second display area 12 and the pixel units 102b of second type in the first display area 10 respectively correspond to the pixel units 122b of fourth type in the second display area 12. The arrangement means implementing a mosaic blurring process to the split screen position of the array substrate 1 provided by the present invention, which can better solve the brightness issue of two screens due to the electrical property difference during the split screen driving.

Figure 2:
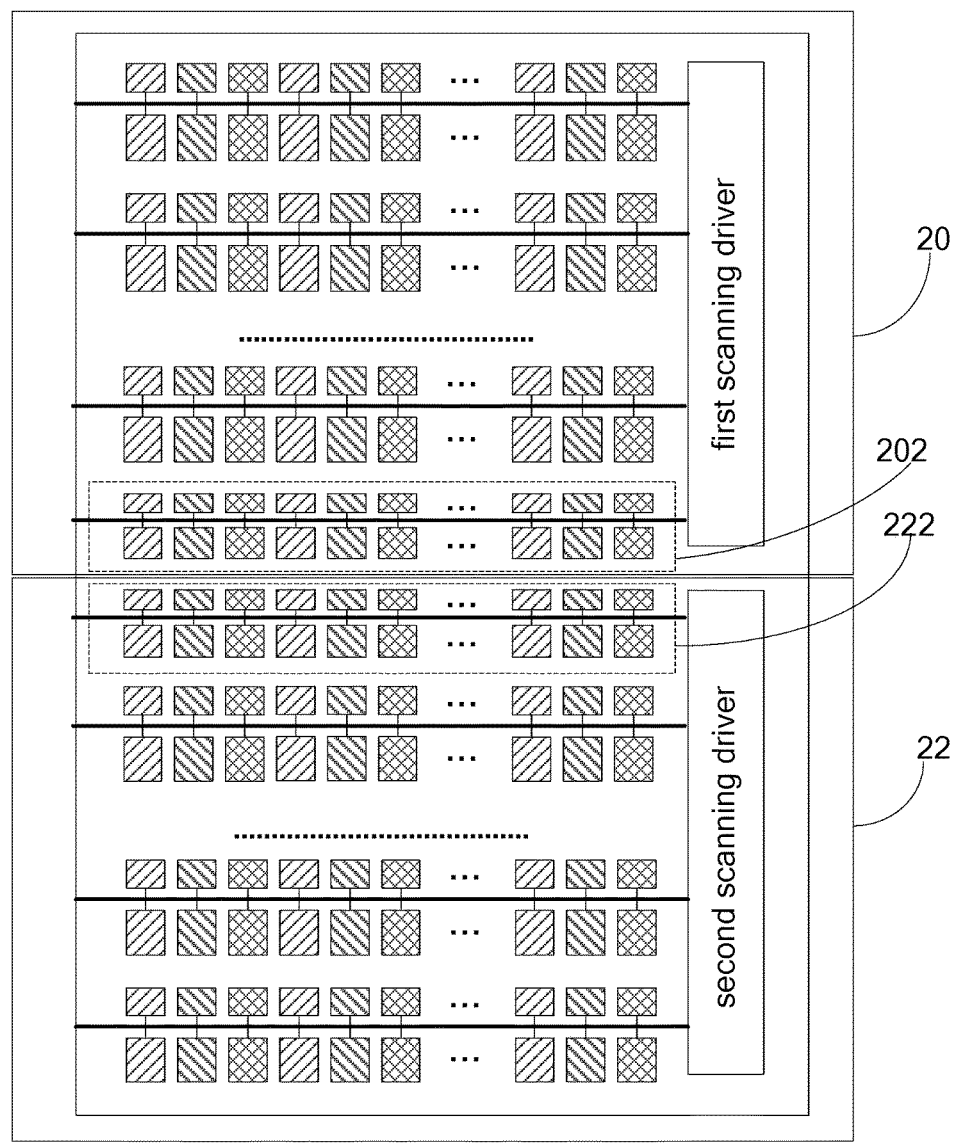
FIG. 2 is a structure diagram of another embodiment according to an array substrate of the present invention.

In another application scenario, as shown in FIG. 2, in the first display area 20, an area of each pixel unit in the row of the pixel units 202 close to the second display area 12 is smaller the area of the pixel unit of the non-edge row in the first display area 20; and/or in the second display area 22, an area of each pixel unit in the row of the pixel units 222 close to the first display area 20 is smaller the area of the pixel unit of the non-edge row in the second display area 22.

In one embodiment, referring to FIG. 1, the pixel units in the first display area 10 are coupled to the first scanning driver 104 and the row of the pixel units 102 in the first display area 10 close to the second display area 12 is as a scanning start row for employing the first scanning driver 104 to scan the pixel units in the first display area 10, i.e. the scanning manner in the first display area 10 is from the middle of the array substrate 1 to the edge (as indicated by the arrow in FIG. 1); the pixel units in the second display area 12 are coupled to the second scanning driver 124 and the row of the pixel units 122 in the second display area 12 close to the first display area 10 is as a scanning start row for employing the second scanning driver 124 to scan the pixel units in the second display area 12, i.e. the scanning manner in the second display area 12 is from the middle of the array substrate 1 to the edge (as indicated by the arrow in FIG. 1); then, the area reduction of the at least one pixel unit in the two rows of pixels at the split screen position provided by the present invention cannot merely solve the brightness issue of two screens due to the electrical property difference while the split screen driving to reduce the probability of the split screen during the split screen driving but the display brightness of the pixel unit at the scanning start position can be reduced to alleviate the issue that the first row of pixel units is too bright because the gate scanning waveform of the first row is too good.

Figure 3:
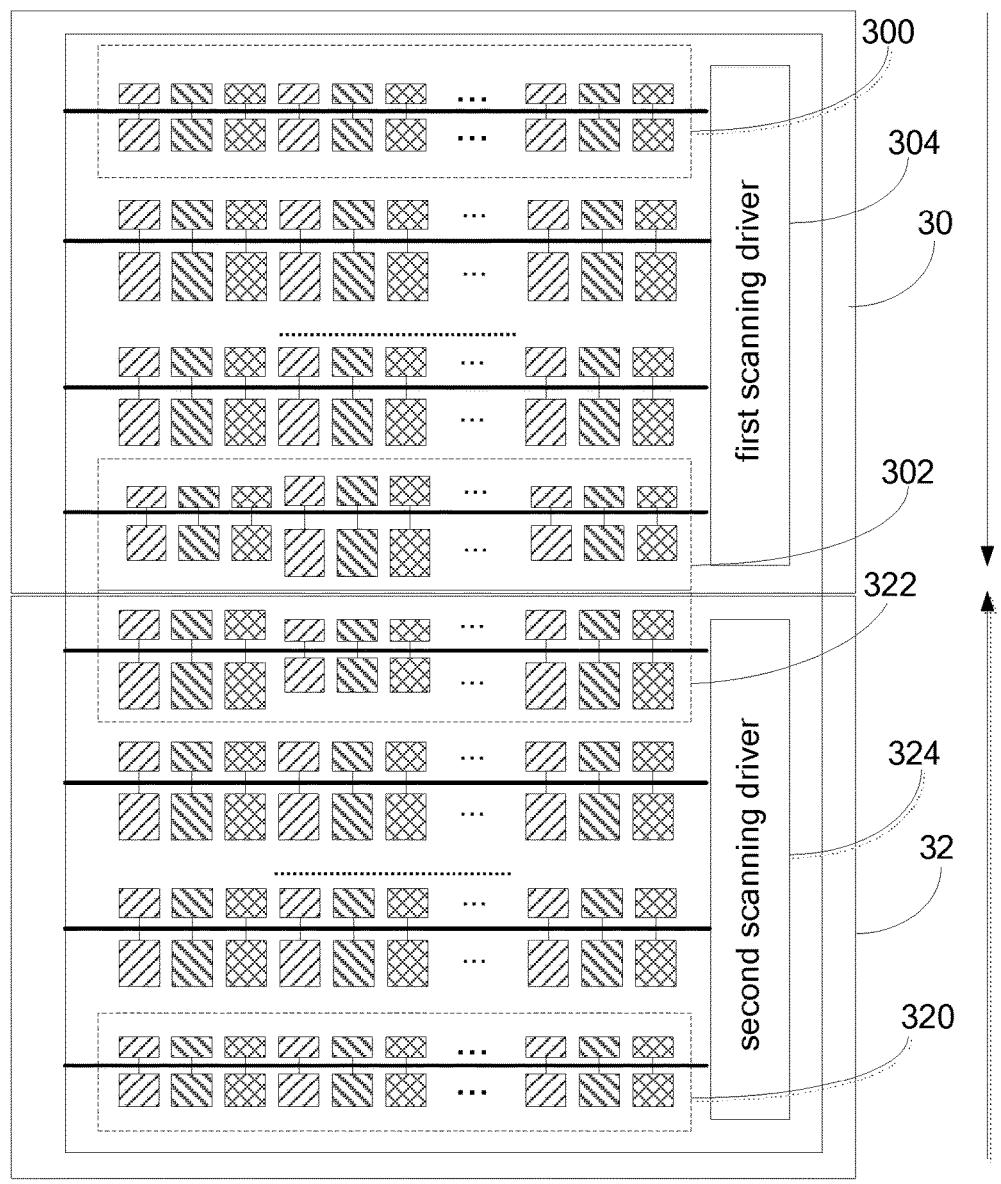
FIG. 3 is a structure diagram of another embodiment according to an array substrate of the present invention.

In another embodiment, referring to FIG. 3, FIG. 3 is a structure diagram of one another embodiment according to an array substrate of the present invention. In this embodiment, the array substrate 3 still uses the row scan driving mode. The scanning manner is indicated by the arrows in FIG. 3. The pixel units in the first display area 30 are coupled to the first scanning driver 304. The row of the pixel units 300 in the first display area 30 close to the edge of the array substrate 3 is as a scanning start row and the row of the pixel units 302 in the first display area 30 close to the second display area 32 is as a scanning finish row; the pixel units in the second display area 32 are coupled to the second scanning driver 324. The row of the pixel units 320 in the second display area 32 close to the edge of the array substrate 3 is as a scanning start row and the row of the pixel units 322 in the second display area 32 close to the first display area 30 is as a scanning finish row; in this embodiment, the row of the pixel units 302 and the row of the pixel units 322 are at the junction of the first display area 30 and the second display area 32 (i.e. the split screen position of the array substrate 3). Then, with the area reduction of the at least one pixel unit in the two rows of pixels 302, 322 at the split screen position, the brightness issue of two screens due to the electrical property difference while the split screen driving can be solved to reduce the probability of the split screen during the split screen driving; besides, in this embodiment, for solving the issue that the display brightness of the pixels at the row scanning start position, the area reduction of the at least one pixel unit in the two rows of pixels 302, 322 at the split screen position can be utilized to alleviate the issue that the first row of pixel units is too bright because the gate scanning waveform of the first row is too good.

In one another embodiment, the array substrate may also use other row scanning split screen driving mode or the column scanning split screen driving mode, which is similar to the scanning method used in the present invention.

Figure 4:
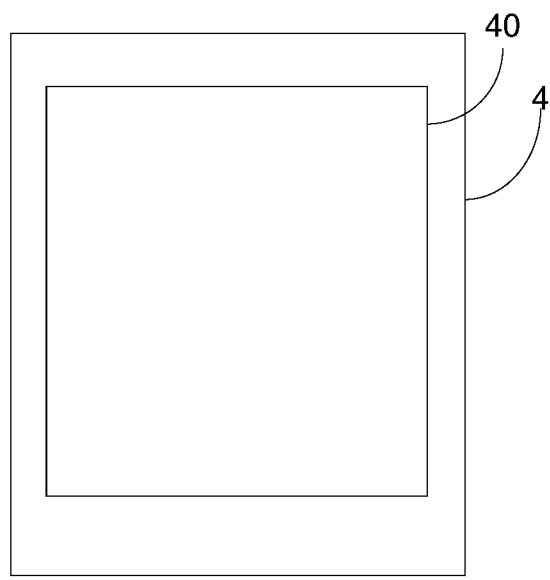
FIG. 4 is a structure diagram of one embodiment according to a display panel of the present invention.

Please refer to FIG. 4. FIG. 4 is a structure diagram of one embodiment according to a display panel of the present invention. The display panel 4 comprises the array substrates 40 in any of the aforesaid embodiments and the repeated description is omitted here.

In conclusion, different from the condition of prior arts, the array substrate provided by the invention uses the split screen driving mode and comprises a first display area and a second display area, wherein in the first display area, an area of at least one pixel unit in the row of the pixel units close to the second display area is smaller an area of a pixel unit of the non-edge row; and/or in the second display area, an area of at least one pixel unit in the row of the pixel units close to the first display area is smaller an area of a pixel unit of the non-edge row; the array substrate provided by the present invention reduces the area of at least one pixel unit in two rows of pixel units at the split screen position and the smaller the area of the pixel unit is, the smaller the opening area becomes and the display brightness is reduced, which can solve the brightness issue of two screens due to the electrical property difference while the split screen driving to prevent the split screen during the split screen driving. Besides, as one row of pixel units of the first display area close to the second display area is the row scanning start position and/or one row of pixel units of the second display area close to the first display area is the row scanning start position, it is possible to reduce the display brightness of the pixel unit at the scanning start position by reducing the area of the at least one pixel unit in the two rows of pixel units at the split screen position, thereby alleviating the issue that the first row of pixel units is too bright because the gate scanning waveform of the first row is too good according to the present invention.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. An array substrate, comprising:
   a first display area, comprising a plurality of pixel units arranged in array, wherein the pixel units in the first display area are coupled to a first scanning driver;
   a second display area, being adjacent to the first display area and comprising a plurality of pixel units arranged in array, wherein the pixel units in the second display area are coupled to a second scanning driver and the pixel units in the first display area and the pixel units in the second display area constitute a pixel array, wherein row amounts of the pixel units of the first display area and the second display area are the same;

wherein a row of pixel units in the first display area close to the second display area is as a first scanning start row, an area of at least one pixel unit in the row of the pixel units as the first scanning start row is smaller an area of a pixel unit of a non-edge row and the area of the at least one pixel unit in the row of the pixel units as the first scanning start row is 0.1 to 0.9 of the area of the pixel unit of the non-edge row in the first display area; and/or a row of pixel units in the second display area close to the first display area is as a second scanning start row, an area of at least one pixel unit in the row of the pixel units as the second scanning start row is smaller an area of a pixel unit of a non-edge row and the area of the at least one pixel unit in the row of the pixel units as the second scanning start row is 0.1 to 0.9 of the area of the pixel unit of the non-edge row in the second display area.

2. The array substrate according to claim 1, wherein in the first display area, an area of each pixel unit in the row of the pixel units close to the second display area is smaller the area of the pixel unit of the non-edge row; and/or in the second display area, an area of each pixel unit in the row of the pixel units close to the first display area is smaller the area of the pixel unit of the non-edge row.

3. The array substrate according to claim 1, wherein in the first display area, the row of pixel units close to the second display area comprises a plurality of pixel units of first type and a plurality of pixel units of second type, wherein the plurality of pixel units of first type and the plurality of pixel units of second type are alternated respectively according to predetermined amounts, an area of the pixel units of first type is smaller than the area of the pixel unit of the non-edge row and an area of the pixel units of second type is the same as the area of the pixel unit of the non-edge row; and/or the row of pixel units in the second display area close to the first display area comprises a plurality of pixel units of third type and a plurality of pixel units of fourth type, wherein the plurality of pixel units of third type and the plurality of pixel units of fourth type are alternated respectively according to predetermined amounts, an area of the pixel units of third type is the same as the area of the pixel unit of the non-edge row and an area of the pixel units of fourth type is smaller than the area of the pixel unit of the non-edge row.

4. The array substrate according to claim 3, wherein the area of the pixel units of fourth type is the same as the area of the pixel units of first type.

5. The array substrate according to claim 4, wherein the pixel units of first type in the first display area respectively correspond to the pixel units of third type in the second display area and the pixel units of second type in the first display area respectively correspond to the pixel units of fourth type in the second display area.

6. An array substrate, comprising:
a first display area, comprising a plurality of pixel units arranged in array;
a second display area, being adjacent to the first display area and comprising a plurality of pixel units arranged in array, wherein the pixel units in the first display area and the pixel units in the second display area constitute a pixel array, wherein row amounts of the pixel units of the first display area and the second display area are the same;

wherein in the first display area, an area of at least one pixel unit in the row of the pixel units close to the second display area is smaller an area of a pixel unit of a non-edge row; and/or in the second display area, an area of at least one pixel unit in the row of the pixel units close to the first display area is smaller an area of a pixel unit of a non-edge row.

7. The array substrate according to claim 6, wherein in the first display area, an area of each pixel unit in the row of the pixel units close to the second display area is smaller the area of the pixel unit of the non-edge row; and/or in the second display area, an area of each pixel unit in the row of the pixel units close to the first display area is smaller the area of the pixel unit of the non-edge row.

8. The array substrate according to claim 6, wherein in the first display area, the row of pixel units close to the second display area comprises a plurality of pixel units of first type and a plurality of pixel units of second type, wherein the plurality of pixel units of first type and the plurality of pixel units of second type are alternated respectively according to predetermined amounts, an area of the pixel units of first type is smaller than the area of the pixel unit of the non-edge row and an area of the pixel units of second type is the same as the area of the pixel unit of the non-edge row; and/or the row of pixel units in the second display area close to the first display area comprises a plurality of pixel units of third type and a plurality of pixel units of fourth type, wherein the plurality of pixel units of third type and the plurality of pixel units of fourth type are alternated respectively according to predetermined amounts, an area of the pixel units of third type is the same as the area of the pixel unit of the non-edge row and an area of the pixel units of fourth type is smaller than the area of the pixel unit of the non-edge row.

9. The array substrate according to claim 8, wherein the area of the pixel units of fourth type is the same as the area of the pixel units of first type.

10. The array substrate according to claim 9, wherein the pixel units of first type in the first display area respectively correspond to the pixel units of third type in the second display area and the pixel units of second type in the first display area respectively correspond to the pixel units of fourth type in the second display area.

11. The array substrate according to claim 6, wherein in the first display area, the area of the at least one pixel unit in the row of the pixel units close to the second display area is 0.1 to 0.9 of the area of the pixel unit of the non-edge row in the first display area; and/or in the second display area, the area of the at least one pixel unit in the row of the pixel units close to the first display area is 0.1 to 0.9 of the area of the pixel unit of the non-edge row in the second display area.

12. The array substrate according to claim 6, wherein the pixel units in the first display area are coupled to a first scanning driver and the row of pixel units in the first display area close to the second display area is as a scanning start row; and/or the pixel units in the second display area are coupled to a second scanning driver and the row of pixel units in the second display area close to the first display area is as a scanning start row.

13. The array substrate according to claim 6, wherein each of the pixel units in the display area and in the second display area respectively comprises a red (R) sub pixel unit, a green (G) sub pixel unit and a blue (B) sub pixel unit;

and/or each of the sub pixel units in the display area and in the second display area respectively comprises a main pixel electrode and a sub pixel electrode.

14. A display panel, comprising an array substrate, wherein the array substrate comprises:
 a first display area, comprising a plurality of pixel units arranged in array;
 a second display area, being adjacent to the first display area and comprising a plurality of pixel units arranged in array, wherein the pixel units in the first display area and the pixel units in the second display area constitute a pixel array, wherein row amounts of the pixel units of the first display area and the second display area are the same;
 wherein in the first display area, an area of at least one pixel unit in the row of the pixel units close to the second display area is smaller an area of a pixel unit of a non-edge row; and/or in the second display area, an area of at least one pixel unit in the row of the pixel units close to the first display area is smaller an area of a pixel unit of a non-edge row.

15. The display panel according to claim 14, wherein in the first display area, an area of each pixel unit in the row of the pixel units close to the second display area is smaller the area of the pixel unit of the non-edge row; and/or
 in the second display area, an area of each pixel unit in the row of the pixel units close to the first display area is smaller the area of the pixel unit of the non-edge row.

16. The display panel according to claim 14, wherein in the first display area, the row of pixel units close to the second display area comprises a plurality of pixel units of first type and a plurality of pixel units of second type, wherein the plurality of pixel units of first type and the plurality of pixel units of second type are alternated respectively according to predetermined amounts, an area of the pixel units of first type is smaller than the area of the pixel unit of the non-edge row and an area of the pixel units of second type is the same as the area of the pixel unit of the non-edge row; and/or
 the row of pixel units in the second display area close to the first display area comprises a plurality of pixel units of third type and a plurality of pixel units of fourth type, wherein the plurality of pixel units of third type and the plurality of pixel units of fourth type are alternated respectively according to predetermined amounts, an area of the pixel units of third type is the same as the area of the pixel unit of the non-edge row and an area of the pixel units of fourth type is smaller than the area of the pixel unit of the non-edge row.

17. The display panel according to claim 16, wherein the area of the pixel units of fourth type is the same as the area of the pixel units of first type.

18. The display panel according to claim 17, wherein the pixel units of first type in the first display area respectively correspond to the pixel units of third type in the second display area and the pixel units of second type in the first display area respectively correspond to the pixel units of fourth type in the second display area.

19. The display panel according to claim 14, wherein in the first display area, the area of the at least one pixel unit in the row of the pixel units close to the second display area is 0.1 to 0.9 of the area of the pixel unit of the non-edge row in the first display area; and/or
 in the second display area, the area of the at least one pixel unit in the row of the pixel units close to the first display area is 0.1 to 0.9 of the area of the pixel unit of the non-edge row in the second display area.

20. The display panel according to claim 14, wherein the pixel units in the first display area are coupled to a first scanning driver and the row of pixel units in the first display area close to the second display area is as a scanning start row; and/or
 the pixel units in the second display area are coupled to a second scanning driver and the row of pixel units in the second display area close to the first display area is as a scanning start row.

\* \* \* \* \*